(12) United States Patent
Sakurai et al.

(10) Patent No.: US 7,301,139 B1
(45) Date of Patent: Nov. 27, 2007

(54) PHOTOELECTRIC COUPLING ASSEMBLY AND METHOD OF MANUFACTURE THEREOF

(75) Inventors: Wataru Sakurai, Yokohama (JP); Mitsuaki Tamura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/727,365

(22) Filed: Mar. 26, 2007

(30) Foreign Application Priority Data

Apr. 5, 2006 (JP) ............................. 2006-104203

(51) Int. Cl.
*G02B 6/38* (2006.01)

(52) U.S. Cl. ................ 250/227.11; 385/88; 385/89; 385/92

(58) Field of Classification Search ........... 250/227.11; 385/39, 40, 88, 89, 92, 100, 101, 104, 111
See application file for complete search history.

(56) References Cited

U.S. PATENT DOCUMENTS

2005/0063651 A1   3/2005   Hamasaki et al.
2005/0141824 A1 * 6/2005   Furuyama et al. ............ 385/89
2006/0039658 A1 * 2/2006   Furuyama et al. ............ 385/90
2006/0291783 A1 * 12/2006  Hamasaki et al. ............ 385/88

FOREIGN PATENT DOCUMENTS

JP         2005-043622         2/2005

* cited by examiner

*Primary Examiner*—John R. Lee
(74) *Attorney, Agent, or Firm*—Global IP Counselors, LLP

(57) ABSTRACT

Three-dimensional wiring can be easily laid and an electrode terminating on a slanted surface can be easily formed. A photoelectric coupling assembly comprises a photoelectric conversion unit and a molded article. The molded article includes a hole to receive an optical fiber, a distal end surface being slanted to an axis of the hole, a side surface forming an acute angle with the distal end surface, and an electrode mounted to the distal end surface. The electrode has a first end terminating within the distal end surface and a second end having an end surface exposed on the side surface. A method includes holding a wiring plate having a lead in a state where a supported end of the lead is positioned on a side surface of the molded article and insert-molding the article, cutting the wiring plate from the article, and mounting the conversion unit on the distal end surface.

7 Claims, 4 Drawing Sheets

PHOTOELECTRIC COUPLING ASSEMBLY AND METHOD OF MANUFACTURE THEREOF

BACKGROUND OF THE INVENTION

1. Field of the Invention

The present invention relates to a photoelectric coupling assembly for connecting an electrical circuit and an optical fiber and a method for manufacturing the photoelectric coupling assembly.

2. Description of the Background Art

With the development of broadband communication system, higher speeds and larger capacities have been needed for networked household electric appliances as well as for routers at network nodes. An application of an optical interconnection is expanding in which a photoelectric conversion is carried out at signal processing/transmission interfaces and a high-speed and high-capacity transmission is carried out by utilizing the broadband capacity of an optical fiber. Disclosed, for example, in Japanese Patent Application Publication Laid-Open No. 2005-43622 is a technique in which an electrical circuit and an optical fiber are coupled by using a photoelectric coupling assembly that includes a photoelectric conversion element (a light-emitting element or a light-receiving element) and an optical fiber holding member at a point of photoelectric conversion.

In the above document, an electrical wiring in the photoelectric coupling assembly may be laid from an end surface to a side surface of the optical fiber holding member, which offers a large degree of latitude with regard to the position of the photoelectric coupling assembly on the electrical circuit. However, forming three-dimensional continuous electrical wiring on a surface of an object is inherently difficult. In particular, forming electrodes that terminate within the end surface of the optical fiber holding member is extremely difficult when the end surface is slanted.

SUMMARY OF THE INVENTION

It is an object of the present invention to provide a photoelectric coupling assembly whose electrode terminating on a slanted surface can be readily formed, and a method for manufacturing the photoelectric coupling assembly.

In order to achieve the object, a photoelectric coupling assembly is provided that comprises: (1) a photoelectric conversion unit including a photoelectric conversion element; and (2) a molded article. The molded article includes an optical fiber insertion hole configured and arranged to receive an optical fiber therethrough with a distal end of the optical fiber facing an active layer of the photoelectric conversion element, a distal end surface on which the photoelectric conversion unit is mounted, the distal end surface being slanted relative to an axial direction of the optical fiber insertion hole, a side surface forming an acute angle with the distal end surface, and an electrode mounted to the distal end surface and electrically connected with the photoelectric conversion element, the electrode having a first end that terminates within the distal end surface and a second end having an end surface that is exposed on the side surface.

The end surface of the second end of the electrode is preferably plated with metal. The second end of the electrode preferably protrudes beyond the side surface.

Another aspect of the present invention provides a method for manufacturing a photoelectric coupling assembly including a photoelectric conversion unit with a photoelectric conversion element, and a molded article including an optical fiber insertion hole, a distal end surface slanted relative to an axial direction of the optical fiber insertion hole and an electrode. The method comprises (1) holding, in a mold, a wiring plate having a lead to be used as the electrode in a state in which a supported end of the lead is positioned on a side surface of the molded article that forms an acute angle with the distal end surface, and then insert-molding the molded article; (2) cutting the wiring plate at the supported end from the molded article removed from the mold; and (3) mounting the photoelectric conversion unit on the distal end surface of the molded article so that an active layer of the photoelectric conversion element faces the optical fiber insertion hole and an electrode terminal of the photoelectric conversion element is electrically connected to the electrode.

In this method, the supported end may be cut with a dicing machine, punched out with a stamping die, or cut with a laser.

BRIEF DESCRIPTION OF THE DRAWINGS

These and other features, aspects, and advantages of the present invention will be better understood through the following description, appended claims, and accompanying drawings. In the explanation of the drawings, identical notation is applied to identical elements and overlapping explanations will be omitted.

FIGS. 3A through 3C are schematic diagrams used to describe the step of forming the molded article, wherein FIG. 3A is a sectional view before the cavity is formed, FIG. 3B is a sectional view after the cavity is formed, and FIG. 3C is a sectional view after the die has been removed;

DETAILED DESCRIPTION OF THE INVENTION

Figure 1:
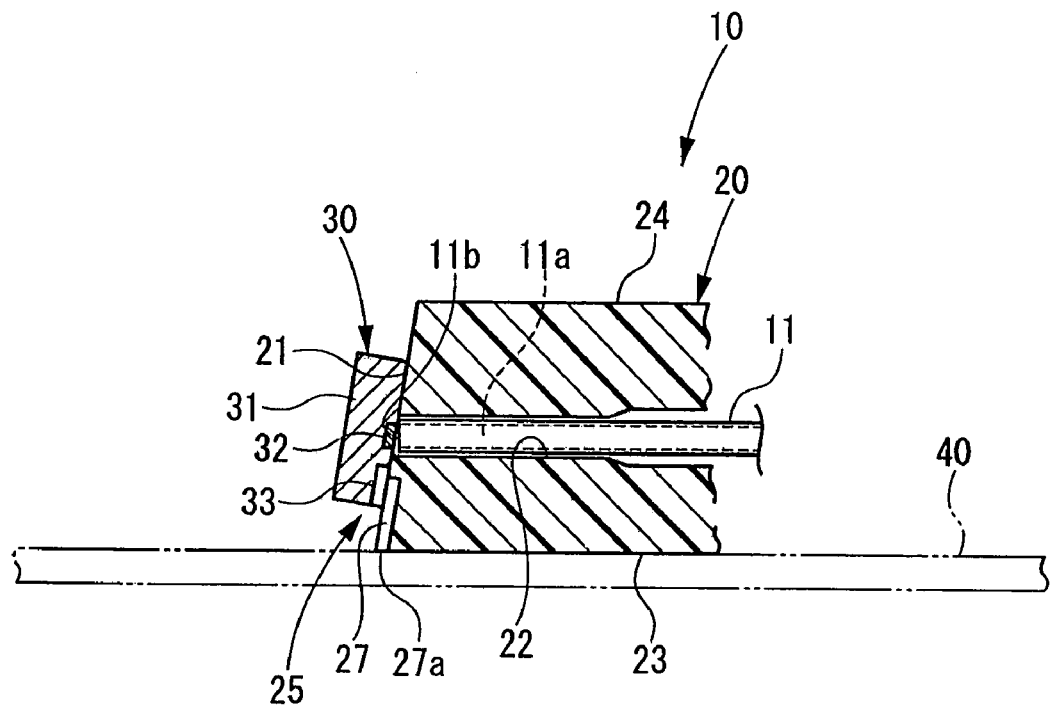
FIG. 1 is a sectional view of an embodiment of a photoelectric coupling assembly according to the present invention.
Figure 2:
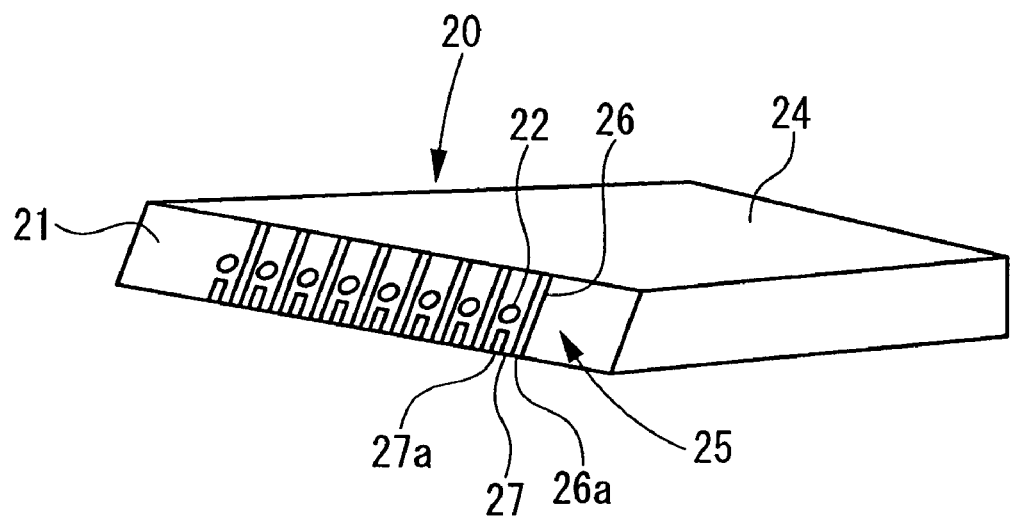
FIG. 2 is a perspective view of a molded article that constitutes the photoelectric coupling assembly of FIG. 1.

FIG. 1 is a sectional view of an embodiment of a photoelectric coupling assembly according to the present invention, and FIG. 2 is a perspective view of a molded article that constitutes the photoelectric coupling assembly of FIG. 1. A photoelectric coupling assembly 10 includes a rectangular parallel-piped molded article 20 and a photoelectric conversion unit 30 that is mounted on and integrated with a distal end surface 21 of the molded article 20.

A plurality of holes 22 into which an optical fiber is inserted and which open on the distal end surface 21 are arranged in a row in the width-wise direction of the molded article 20 at prescribed intervals. End portions 11a of optical fibers 11 can be inserted in the optical fiber insertion holes 22, and terminal surfaces 11b of the inserted optical fibers 11 are exposed on the distal end surface 21 of the molded article 20.

The distal end surface 21 of the molded article 20 is slanted relative to the axial direction of the optical fiber insertion holes 22. Specifically, the distal end surface 21 gradually recedes from a bottom surface 23 (the surface on which the molded article 20 is mounted on the substrate 40; on the lower side of the example shown in the drawings) to an upper surface 24. The angle between the distal end surface 21 and the bottom surface 23 is thus an acute angle. The angle is preferably 80° or more and 88° or less. The distal end surface 21 is slanted so that the terminal surfaces 11b of the optical fibers 11 that are inserted in the optical fiber insertion holes 22 do not strike and damage an active layer 32 of the photoelectric conversion unit 30 (described hereunder) mounted on the distal end surface 21. The active layer 32 is smaller than the outside diameter of the fiber, and therefore collisions with the active layer 32 of the photoelectric conversion unit 30 can be avoided by forming the distal end surface 21 at a slant.

Electrical wiring 25 is provided on the distal end surface 21 of the molded article 20. The electrical wiring 25 includes: long electrodes 26 that are provided across the entire thickness of the molded article 20; and short electrodes 27 that are provided from the lower end of the molded article 20 so as to terminate near the center in the thickness direction. The long electrodes 26 and short electrodes 27 are provided in pairs to each of the optical fiber insertion holes 22. The long electrodes 26 are positioned beside the optical fiber insertion holes 22, and the short electrodes 27 are positioned below the optical fiber insertion holes 22. Terminal surfaces 26a, 27a on the lower ends of the long electrodes 26 and short electrodes 27 slightly protrude from and are exposed on the bottom surface 23 of the molded article 20. The amount of protrusion is preferably 0.005 mm or more and 0.1 mm or less. The terminal surfaces 26a, 27a of the long electrodes 26 and the short electrodes 27 are plated with metal.

The photoelectric conversion unit 30 is provided with at least one photoelectric conversion element 31. The active layer 32 and a terminal electrode 33 are provided to the mounting surface (the surface on the side of the molded article 20) of the photoelectric conversion element 31. The photoelectric conversion unit 30 is mounted on the molded article 20 such that the active layer 32 of the photoelectric conversion element 31 is held in a position at a location that faces the optical fiber insertion holes 22 and the terminal electrode 33 is electrically connected to the long electrode 26 and the short electrode 27 of the molded article 20.

The photoelectric coupling assembly 10 having the optical fibers 11 inserted into the optical fiber insertion holes 22 is mounted on the substrate 40 in a state where the bottom surface 23 of the molded article 20 contacts with the substrate 40. In this state, the terminal surfaces 26a, 27a of long electrode 26 and short electrode 27, respectively, are soldered and connected to a wiring pattern (not shown) on the substrate 40. The terminal electrode 33 of the photoelectric conversion element 31 and the wiring pattern of the substrate 40 are thereby electrically connected via the electrical wiring 25 of the molded article 20. As a result, the photoelectric conversion element 31 receives drive signals supplied from the substrate 40 and transmits optical signals to the optical fibers 11; alternatively, the photoelectric conversion element 31 converts optical signals from the optical fibers 11 into electrical signals and transmits the signals to the substrate 40.

Figure 3A:
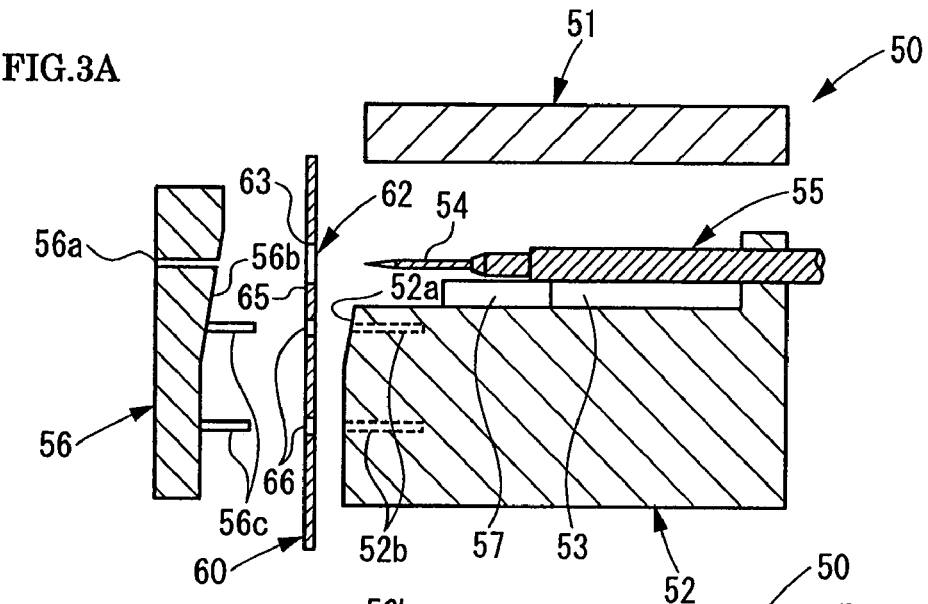
Figure 3B:
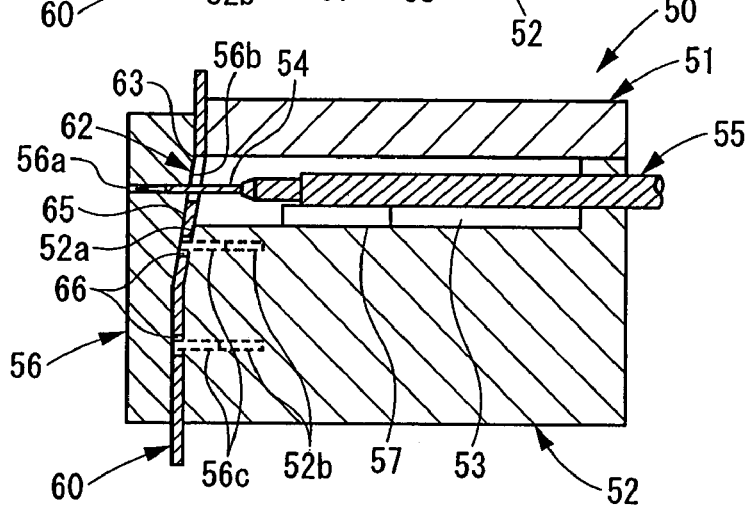
Figure 3C:
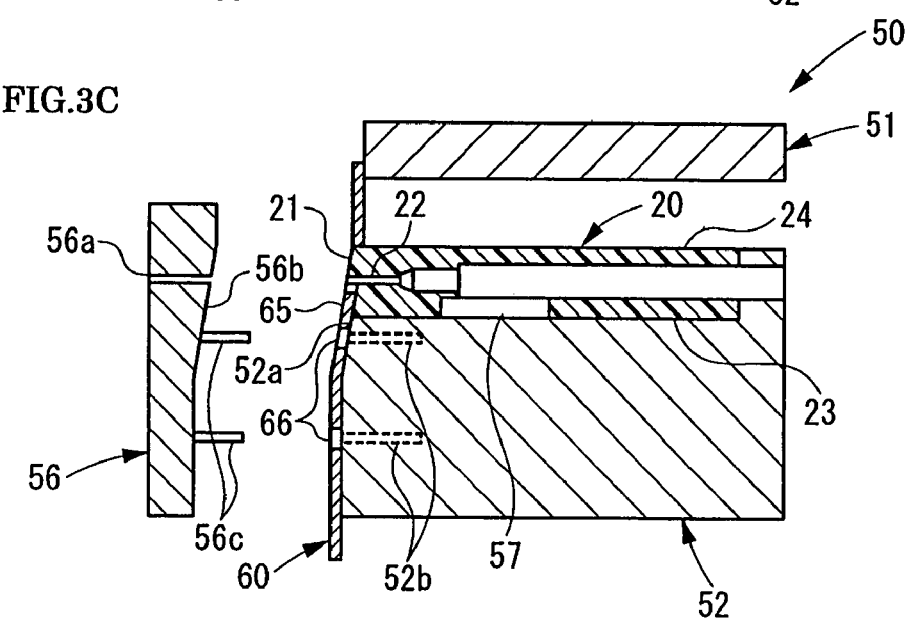
Figure 4:
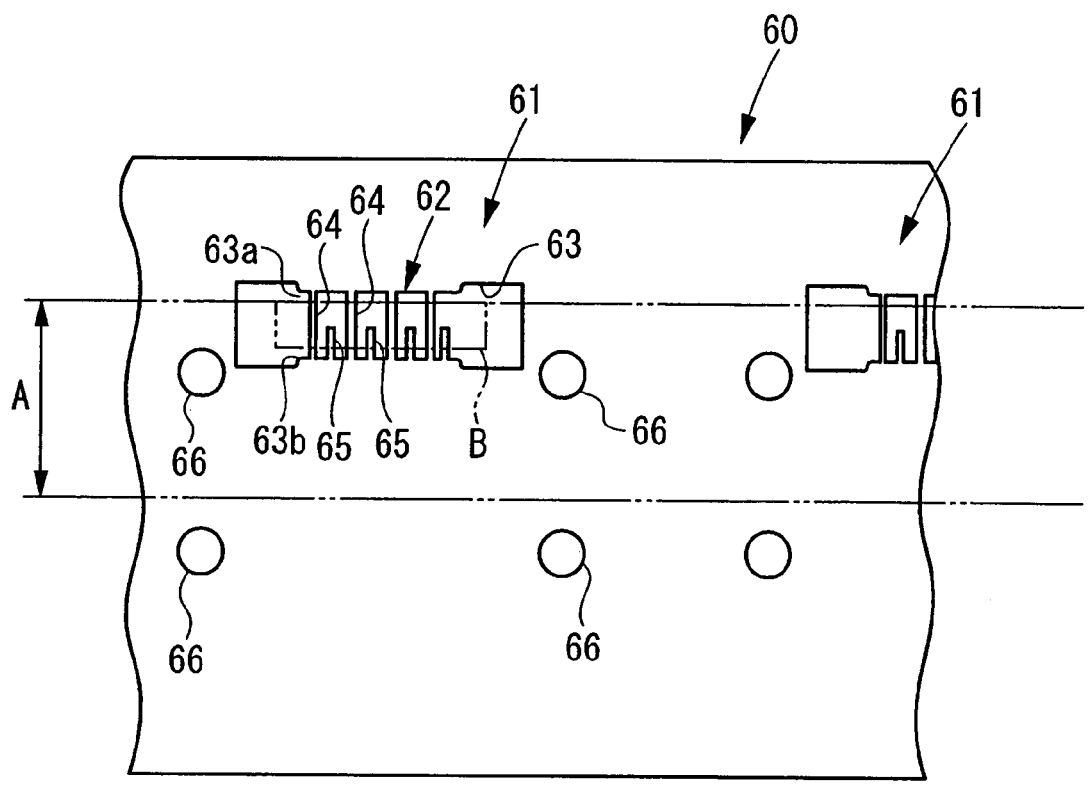
FIG. 4 is a plan view of an example of a wire plate that is used in the method for manufacturing a photoelectric coupling assembly according to the present invention.
Figure 5:
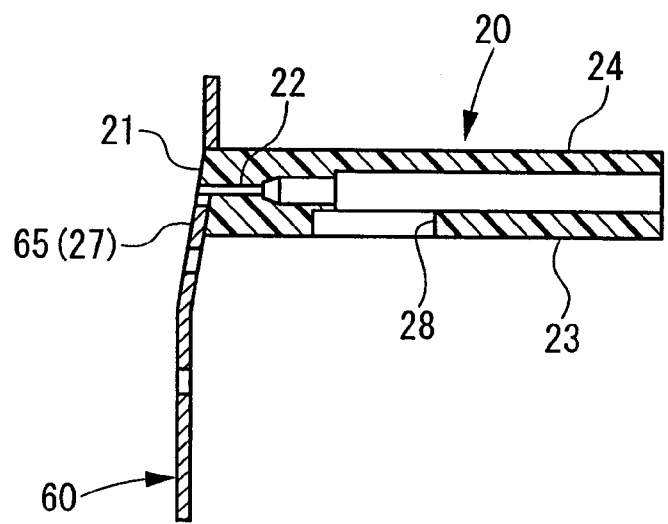
FIG. 5 is a sectional view of an example of the molded article which is removed from the die in the method for manufacturing a photoelectric coupling assembly according to the present invention.

A method for manufacturing the photoelectric coupling assembly 10 will be described next. FIGS. 3A through 3C are schematic diagrams used to describe the step of forming the molded article, FIG. 4 is a plan view of an example of a wire plate that is used in the method for manufacturing a photoelectric coupling assembly according to the present invention, and FIG. 5 is a sectional view of an example of the molded article which is removed from the die in the method for manufacturing a photoelectric coupling assembly according to the present invention. The photoelectric coupling assembly 10 is manufactured by the steps of insert-molding the molded article 20 that has the electrical wiring 25 on the distal end surface 21; cutting off the wire plate that is attached to the molded article 20 which is removed from the die; and mounting the photoelectric conversion unit 30 on the distal end surface 21 of the molded article 20.

A mold 50 used to form the molded article 20 has an upper die 51 and a lower die 52, as shown in FIGS. 3A through 3C, and forms a cavity 53 in which the molded article 20 is formed when the upper and lower dies 51, 52 are joined together. Between the upper and lower dies 51, 52 are provided: a first slide core 55 that has core pins 54 for forming the optical fiber insertion holes 22; and a second slide core 56 that is positioned facing the first slide core 55 and forms the distal end surface 21, on which the terminal surfaces 11b of the optical fibers 11 are exposed, on the molded article 20. Holding holes 56a are provided to the second slide core 56 in order to hold the core pins 54 therein. The ends of the core pins 54 are inserted in the holding holes 56a, whereby the core pins 54 are held precisely in place within the cavity 53.

A height adjustable convexity 57 for regulating the height of the first slide core 55 is provided in a nested configuration to the center of the lower die 52. The convexity 57 supports the first slide core 55 from the lower side during resin injection and forms an adhesive-injection port 28, which is described hereinafter, for injecting an adhesive to fix the optical fibers 11 to the photoelectric coupling assembly 10.

Mutually opposing surfaces of the lower die 52 and the second slide core 56 are molding surface 52a and 56b which are slanted at the same angle as the distal end surface 21 of the molded article 20. Holding holes 52b are formed on the lower die 52 and holding pins 56c are provided to the second slide core 56. The second slide core 56 is positioned to the lower die 52 by inserting the holding pins 56c into the holding holes 52b.

As shown in FIG. 4, a wiring plate 60 that will become the electrical wiring 25, insert-molded on the distal end surface 21 of the molded article 20, includes a long, belt-shaped metal plate. Insertion parts 61 are formed at intervals in the longitudinal direction on the wiring plate 60 using an etching process or a punching process that employs a press, for example. Each insertion part 61 corresponds to one molded article 20, and a lead 62 is formed at the upper end of a clamped range A clamped by the molding surfaces 52a, 56b of the lower die 52 and the second slide core 56.

The lead 62 has a long lead 64 and a short lead 65 that are alternatingly formed between top long side 63a and bottom long side 63b of a long hole 63. The long lead 64 is formed across the space between the top long side 63a and bottom long side 63b of the long hole 63, and the short lead 65 extends from the lower long side 63b of the long hole 63 to near the center of the long hole 63 in the height direction, where one end thereof terminates. In the lead 62, the center portion of the long hole 63 is a rectangular molded region B that is inserted into the distal end surface 21 of the molded article 20.

Holding holes 66, into which are inserted the holding pins 56c that are formed in the second slide core 56 of the mold 50, are formed at intervals in the height direction on both sides of the lead 62. The holding pins 56c are inserted into the holding holes 66, whereby the wiring plate 60 is held with high precision relative to the mold 50.

FIG. 3A is a sectional view before the cavity is formed. In order to form the molded article 20 with the mold 50, first, the insertion parts 61 of the wiring plate 60 are positioned between the lower die 52 and the second slide core 56. Next, the upper die 51 is made to descend onto the lower die 52, and then the second slide core 56 is moved to face the lower die 52 and the first slide core 55 is moved to the side of the second slide core 56.

In this manner, the cavity 53 for forming the molded article 20 is formed by the upper die 51 and the lower die 52, as shown in FIG. 3B (a sectional view after the cavity is formed). The wiring plate 60 is held in place on the lower die 52 by the holding pins 56c and is clamped by the lower die 52 and the second slide core 56. The clamped range A of the wiring plate 60 is slanted at the same angle as the molding surfaces 52a, 56b by the molding surfaces 52a, 56b of the lower die 52 and the second slide core 56. In this instance, since the molding surface 56b of the second slide core 56 slants gradually to the side of the lower die 52 in the end portion of the short lead 65, the short lead 65 which is a cantilever fixed to the long side 63b is pushed and bent in the direction of the cavity 53 by the molding surface 56b.

A resin is then injected into the cavity 53. Once the resin has cured, the upper die 51 and the second slide core 56 are separated from the lower die 52 as shown in FIG. 3C (a sectional view after the die has been removed), the first slide core 55 is pulled out, and the molded article is thereby removed from the mold. A molded article 20, whose distal end surface 21 is provided with the wiring plate 60, will be formed as a result of the above operation, as shown in FIG. 5.

The wiring plate 60, which is insert-molded in the distal end surface 21 of the molded article 20, is then cut off at the upper and lower ends of the molded article 20 by a dicing machine. This action will result in a completed molded article 20 that is provided on the slanted distal end surface 21 with a long electrode 26 and a short electrode 27, which is made of the long lead 64 and the short lead 65.

The wiring plate 60 is cut off at lower end of the molding article 20 in a state in which the lower ends of the long lead 64 and the short lead 65 slightly protrude from the bottom surface 23 of the molded article 20. Non-electrolytic plating is then carried out on the terminal surfaces 26a, 27a of the lower ends of the long electrode 26 and the short electrode 27 that protrude from the bottom surface 23 of the molded article 20.

Once the molded article 20 has been insert-molded as described above, the photoelectric conversion unit 30 is mounted on the distal end surface 21, which is the slanted surface of the molded article 20, thereby completing the photoelectric coupling assembly 10. Since the distal end surface 21 of the molded article 20 is a slanted surface in this instance, the active layer 32 of the photoelectric conversion element 31 that is mounted on the distal end surface 21 is also positioned slantwise. Interference between the terminal surfaces 11b of the optical fibers 11 and the active layer 32 can thereby be suppressed when the optical fibers 11 are inserted in the optical fiber insertion holes 22, and damage to the active layer 32 and the optical fibers 11 is prevented.

According to the aforedescribed photoelectric coupling assembly 10 and the method of manufacture thereof, when insert-molding is performed, the short lead 65 is supported as a cantilever on the side of the bottom surface 23, which forms an acute angle with the distal end surface 21, and therefore the entire lead 62, which includes the short lead 65, can be bent by the lower die 52 and the second slide core 56. As a result, the short lead 65, which becomes the short electrode 27, is not embedded within the resin and can be readily wired from the bottom surface to the end surface (conversely, if, when insert-molding is performed, the short lead 65 is supported as a cantilever on the side of the upper surface 24, which forms an obtuse angle with the distal end surface 21, the short lead 65 will penetrate into the interior of the cavity 53 without bending along the slant of the distal end surface 21 and will be embedded within the resin that forms the molded article 20). Drive signals are therefore able to be supplied to the photoelectric conversion element 31 via the electrical wiring 25 of the photoelectric coupling assembly 10, and signals can be transmitted from the photoelectric conversion element 31.

The terminal surfaces 26a, 27a of the long electrode 26 and the short electrode 27 are plated with metal. Therefore, the electrodes 26, 27 can be reliably soldered and connected to the circuit pattern of the substrate 40, and the reliability of the connection points can be increased. The electrodes 26, 27 protrude slightly beyond the bottom surface 23 of the molded article 20, and therefore the electrodes are made to contact the circuit pattern of the substrate 40 under pressure when the photoelectric coupling assembly is mounted on a substrate, allowing the reliability of the connection points to be increased.

The long lead 64 and short lead 65 of the wiring plate 60 are cut by a dicing machine, and therefore cutting accuracy can be improved. The terminal surfaces are cut by using a dicing machine and polished thereby; an extremely favorable surface roughness can accordingly be ensured at the terminal surfaces 26a, 27a of the long electrode 26 and the short electrode 27, which have been made of the long lead 64 and the short lead 65.

The long lead 64 and the short lead 65 of the wiring plate 60 may be cut with a laser or by being punched out with a stamping die. Punching out with a stamping die or cutting with a laser will allow the wiring plate 60 to be readily cut with an adequately reliable degree of accuracy, and will allow productivity to be improved.

Figure 6:
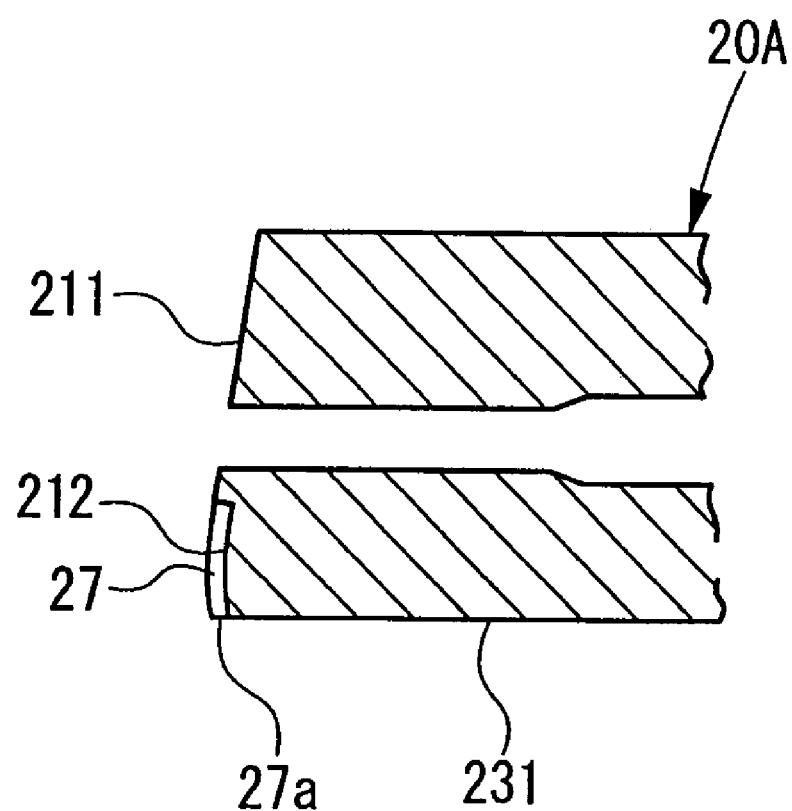
FIG. 6 is a sectional view of a modified example of the molded article of the photoelectric coupling assembly according to the present invention.

The present invention is not limited to the configuration of the embodiments above. For example, a molded article 20A may be also be configured having a transition part 212 between a distal end surface 211 and a bottom surface 231, as shown in FIG. 6. Specifically, the distal end surface 211 may have a shape that is formed to pass beyond a surface that rises vertically from the bottom surface 231. As also holds true with the molded article 20A having a distal end surface 211, the short lead 65 is not embedded in resin during manufacture, and the short electrode 27 can be reliably positioned on the distal end surface 211 of the molded article 20A.

This invention has been described in connection to what are currently considered to be the most practical and preferred embodiments thereof, but is not limited to the disclosed embodiments. However, the invention is intended to cover various modifications and equivalent arrangements included within the spirit and scope of the appended claims.

The entire disclosure of Japanese Patent Application No. 2006-104203, filed on Apr. 5, 2006, including specification, claims, drawings, and summary, is incorporated herein by reference in its entirety.

What is claimed is:

1. A photoelectric coupling assembly comprising:
   (1) a photoelectric conversion unit including a photoelectric conversion element; and
   (2) a molded article including:
   an optical fiber insertion hole configured and arranged to receive an optical fiber therethrough with a distal end of the optical fiber facing an active layer of the photoelectric conversion element;
   a distal end surface on which the photoelectric conversion unit is mounted, the distal end surface being slanted relative to an axial direction of the optical fiber insertion hole;
   a side surface forming an acute angle with the distal end surface; and
   an electrode mounted to the distal end surface and electrically connected with the photoelectric conversion element, the electrode having a first end that terminates within the distal end surface and a second end having an end surface that is exposed on the side surface.

2. A photoelectric coupling assembly according to claim 1, wherein
   the end surface of the second end of the electrode is plated with metal.

3. A photoelectric coupling assembly according to claim 1, wherein
   the second end of the electrode protrudes beyond the side surface.

4. A method for manufacturing a photoelectric coupling assembly including a photoelectric conversion unit with a photoelectric conversion element and a molded article including an optical fiber insertion hole, a distal end surface slanted relative to an axial direction of the optical fiber insertion hole, and an electrode, the method comprising:
   (1) holding, in a mold, a wiring plate having a lead to be used as the electrode in a state in which a supported end of the lead is positioned on a side surface of the molded article that forms an acute angle with the distal end surface, and then insert-molding the molded article;
   (2) cutting the wiring plate at the supported end from the molded article removed from the mold; and
   (3) mounting the photoelectric conversion unit on the distal end surface of the molded article so that an active layer of the photoelectric conversion element faces the optical fiber insertion hole and an electrode terminal of the photoelectric conversion element is electrically connected to the electrode.

5. A method for manufacturing a photoelectric coupling assembly according to claim 4, wherein
   the supported end is cut with a dicing machine.

6. The A method for manufacturing a photoelectric coupling assembly according to claim 4, wherein
   the supported end is punched out with a stamping die.

7. A method for manufacturing a photoelectric coupling assembly according to claim 4, wherein
   the supported end is cut with a laser.

* * * * *